(12) United States Patent
Zeroug et al.

(10) Patent No.: US 9,732,607 B2
(45) Date of Patent: Aug. 15, 2017

(54) METHODS AND APPARATUS FOR EVALUATING PROPERTIES OF CEMENT UTILIZING ULTRASONIC SIGNAL TESTING

(71) Applicant: SCHLUMBERGER TECHNOLOGY CORPORATION, Sugar Land, TX (US)

(72) Inventors: Smaine Zeroug, Lexington, MA (US); Jiaqi Yang, Belmont, MA (US); Sandip Bose, Brookline, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 302 days.

(21) Appl. No.: 14/462,336

(22) Filed: Aug. 18, 2014

(65) Prior Publication Data

US 2016/0047238 A1  Feb. 18, 2016

(51) Int. Cl.
*G01V 1/50* (2006.01)
*E21B 47/09* (2012.01)
*E21B 47/00* (2012.01)

(52) U.S. Cl.
CPC ........ *E21B 47/091* (2013.01); *E21B 47/0005* (2013.01); *G01V 1/50* (2013.01)

(58) Field of Classification Search
CPC .............................. G01V 1/50; E21B 47/0005
USPC ............................................. 367/35; 181/105
See application file for complete search history.

(56) References Cited

U.S. PATENT DOCUMENTS

| | | | |
|---|---|---|---|
| 5,243,855 A | 9/1993 | Stieger et al. | |
| 5,555,218 A | 9/1996 | Chambers et al. | |
| 5,654,938 A * | 8/1997 | Tang ........................ | G01V 1/50 367/28 |
| 5,987,385 A | 11/1999 | Varsamis et al. | |
| 6,633,857 B1 | 10/2003 | Tipping | |
| 6,850,168 B2 * | 2/2005 | Tang ........................ | G01V 1/44 181/105 |
| 7,522,471 B2 | 4/2009 | Froelich et al. | |

(Continued)

FOREIGN PATENT DOCUMENTS

| | | |
|---|---|---|
| WO | 2008064034 A2 | 5/2008 |
| WO | 2010019315 A1 | 2/2010 |
| WO | 2010080355 A2 | 7/2010 |

OTHER PUBLICATIONS

Aeron et al., "Automatic Dispersion Extraction using Continuous Wavelet Transform," IEEE International Conference on Acoustics, Speech and Signal Processing, 2008: pp. 2405-2408.

(Continued)

*Primary Examiner* — Ian J Lobo

(57) ABSTRACT

Apparatus and methods are provided. An ultrasonic tool with an array of axially spaced receivers and a transmitter is located in a borehole and is activated. Ultrasonic waveform indications recorded by the receivers are processed and analyzed to determine the presence of non-dispersive headwave signatures. If a non-dispersive headwave signature is located, the presence of a solid such as cement in the annulus is confirmed, and one or more of the compressional and shear velocities of the cement can be determined. If only casing dispersive mode signatures are found, the annulus is determined to possibly contain no cement at the location of interest and additional processing is required.

30 Claims, 14 Drawing Sheets

(56) References Cited

U.S. PATENT DOCUMENTS

| | | |
|---|---|---|
| 7,649,805 B2 | 1/2010 | Bose et al. |
| 8,126,647 B2 | 2/2012 | Hruska et al. |
| 2005/0261835 A1 | 11/2005 | Wang |
| 2006/0122525 A1 | 6/2006 | Shusterman |
| 2006/0133205 A1 | 6/2006 | Van Kuijk et al. |
| 2006/0198243 A1 | 9/2006 | Tang et al. |
| 2009/0067286 A1 | 3/2009 | Bose et al. |
| 2013/0146282 A1 | 6/2013 | Toms et al. |
| 2015/0198032 A1* | 7/2015 | Sinha .......... E21B 47/0005 166/250.01 |
| 2015/0198732 A1 | 7/2015 | Zeroug et al. |
| 2015/0218930 A1 | 8/2015 | Zeroug et al. |
| 2015/0219780 A1 | 8/2015 | Zeroug et al. |

OTHER PUBLICATIONS

Bellabarba et al., "Ensuring Zonal Isolation Beyond the Life of the Well," Oilfield Review, 2008: pp. 18-31.

Ekstrom, "Dispersion Estimation from Borehole Acoustic Arrays Using a modified Matrix Pencil Algorithm," 29th Asilomar Conference on Signals System. Comput., Oct. 1996: pp. 449-453.

Prosser et al., "Time-frequency analysis of the dispersion of Lamb modes," J. Acoust. Soc. Am., May 1999, vol. 105(5): pp. 2669-2676.

Roueff et al., "Dispersion Estimation from Linear Array Data in the Time-Frequency Plane," IEEE Transactions on Signal Processing, Oct. 2005, vol. 53(10): pp. 3738-3748.

Van Kuijk et al., "IPTC 10546: A Novel Ultrasonic Cased-Hole Imager for Enhanced Cement Evaluation," International Petroleum Technology Conference, Nov. 2005: pp. 1-14.

Zeroug, "Analytical Modeling for Fast Simulations of Ultrasonic Measurements on Fluid-Loaded Layered Elastic Structures," IEEE Transactions on Ultrasonics, Ferroelectrics, and Frequency Control, May 2000, vol. 47(3): pp. 565-574.

Zeroug, "Forward Modeling for Ultrasonic Leaky Lamb-Wave Based Imaging Through a Highly Contrasting Steel Cylindrical-Layer," IEEE Ultrasonics Symposium, 2004: pp. 672-675.

Zeroug et al., "Ultrasonic Leaky-Lamb Wave Imaging Through a Highly Contrasting Layer," IEEE Ultrasonics Symposium, 2003: pp. 794-798.

International Search Report issued in related PCT application PCT/US2015/043899 on Oct. 27, 2015, 3 pages.

International Search Report and Written Opinion for related PCT Application No. PCT/US2014/070249, dated Mar. 31, 2015, 13 pages.

* cited by examiner

METHODS AND APPARATUS FOR EVALUATING PROPERTIES OF CEMENT UTILIZING ULTRASONIC SIGNAL TESTING

TECHNICAL FIELD

The subject disclosure relates to the hydrocarbon industry. More particularly, the subject disclosure relates to using ultrasonic signals for determining the presence of and quantifying properties of cement located in an annulus between a borehole casing and a formation.

BACKGROUND

Prior to producing hydrocarbons from a geological formation it is common to place a casing in the formation and to inject cement into an annulus between the casing and the formation in order to cement the casing in place. Holes in the casing and cement are made to establish fluid connectivity between the formation and the wellbore. The integrity of the cement in the annulus is important, and acoustic evaluation of the cement can be used to determine the integrity of the cement and to further determine whether the cement is providing hydraulic zonal isolation between formation strata traversed by the drilled well (borehole). Failed zonal isolation can lead to significant environmental consequences as well as to compromising the economic viability of the production well.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, an ultrasonic tool with an array of axially spaced receivers and a transmitter is located in a cased borehole and is activated. Ultrasonic waveforms recorded by the receivers are processed and analyzed to determine the presence of non-dispersive headwave signatures. If a substantially non-dispersive headwave signature is located, the presence of cement in the annulus is confirmed, and one or more of the compressional and shear wave velocities of the cement are determined. If only a dispersive signature is found, the annulus is suspected to contain no cement at the location of interest and other methods may be used to ascertain that conclusion with further confidence.

In one embodiment, the waveforms are processed by a modified pencil matrix algorithm to obtain a dispersion plot that plots velocity as a function of frequency.

In one embodiment, dispersions of casing flexural and/or extensional modes (also known as quasi-Lamb modes) are identified. In some embodiments, the flexural and/or extensional mode information is removed from the total signal prior to processing the signal and locating a non-dispersive headwave signature.

In one aspect, wavespeed measurements taken over time of cement in an annulus may be used to monitor the time evolution of the mechanical strength of the cement and provide an estimation of the useful life of the cement sheath.

DETAILED DESCRIPTION

Figure 1:
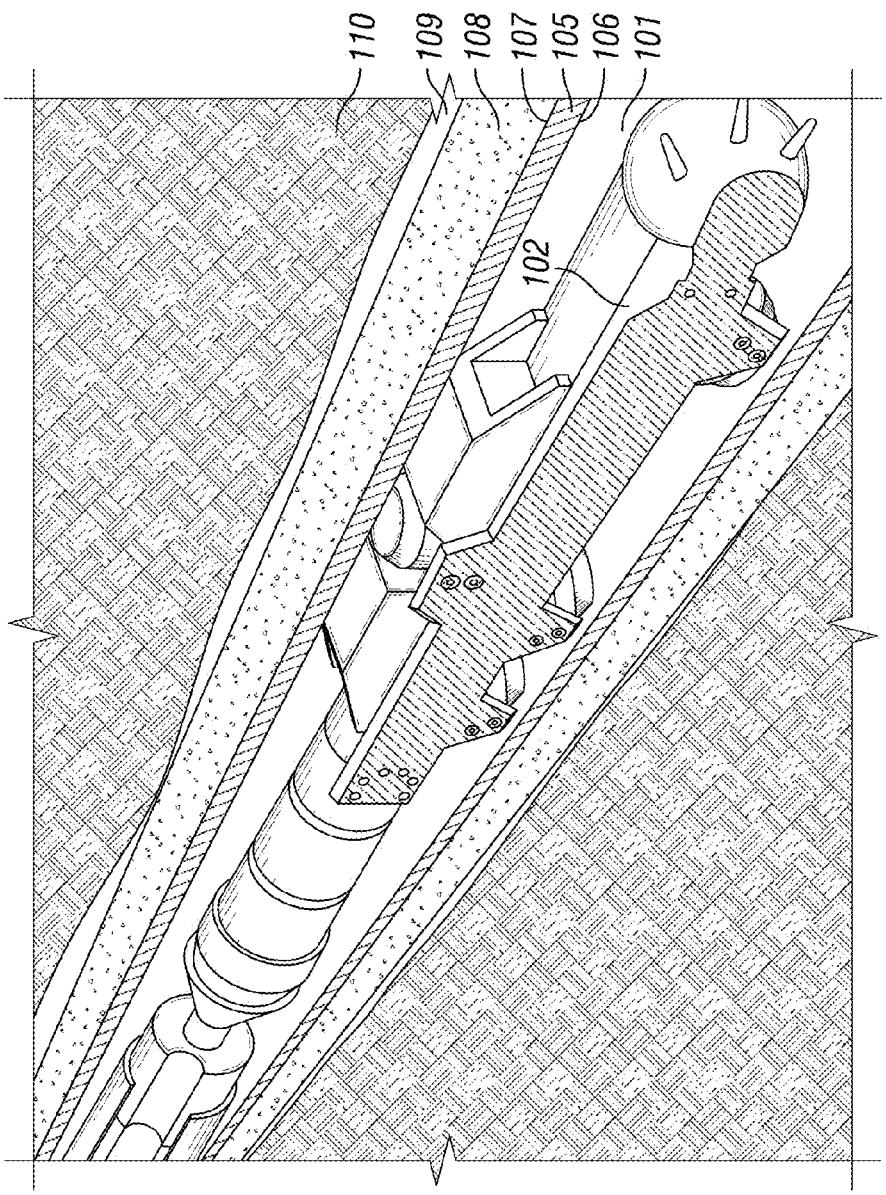
FIG. 1 is a schematic sectional view of a cased wellbore traversing a formation with casing and cement and being logged by an ultrasonic cement evaluation tool.

FIG. 1 provides a sectional view of a wellbore 101 containing an acoustic tool 102 that is used to evaluate the cemented annulus 108 between a casing 105 and the formation 110. The wellbore 101 is encompassed by the casing 105. The casing 105 shares a casing-wellbore surface 106 with the wellbore 101 and a cement-casing surface 107 with the cement 108. Similarly, the cement 108 shares a cement-formation surface 109 (sometimes referred to as the annulus) with the formation 110. These components work together to form a barrier 111 between the wellbore 101 and the formation 110.

The cement 108 and surfaces 107 and 109 between the casing and cement and formation may be continuous and homogeneous, reflecting materials in complete contact with each other, forming a continuous seal across materials. Alternatively, delamination, debonding, fluid incursion, poorly cured cement, chemical reactions and erosion in combination with other factors may yield surfaces that are not completely in contact with each other, and/or cement that has poor sealing properties. That is, the exterior of the cement at surface 107 may or may not meet with the exterior of the casing at surface 107. Similarly, the exterior of the cement at surface 109 may not completely abut the exterior surface of the formation at surface 109. These surface bond inconsistencies may allow undesirable fluid flow and resulting barrier failure. Similarly, the cement 108 may not be continuous and/or strong enough to prevent undesirable fluid flow within it, resulting in barrier failure.

It will be appreciated that while FIG. 1 shows only one set of casing and cement, in some embodiments there may be multiple casings surrounded by multiple cement components. Moreover, a production tubing within the production casing may also be present. As used herein, the term "cement" may refer to common cements as well as sealing material made of synthetic compounds such as, by way of example and not by way of limitation, resin with glass beads.

Figure 2:
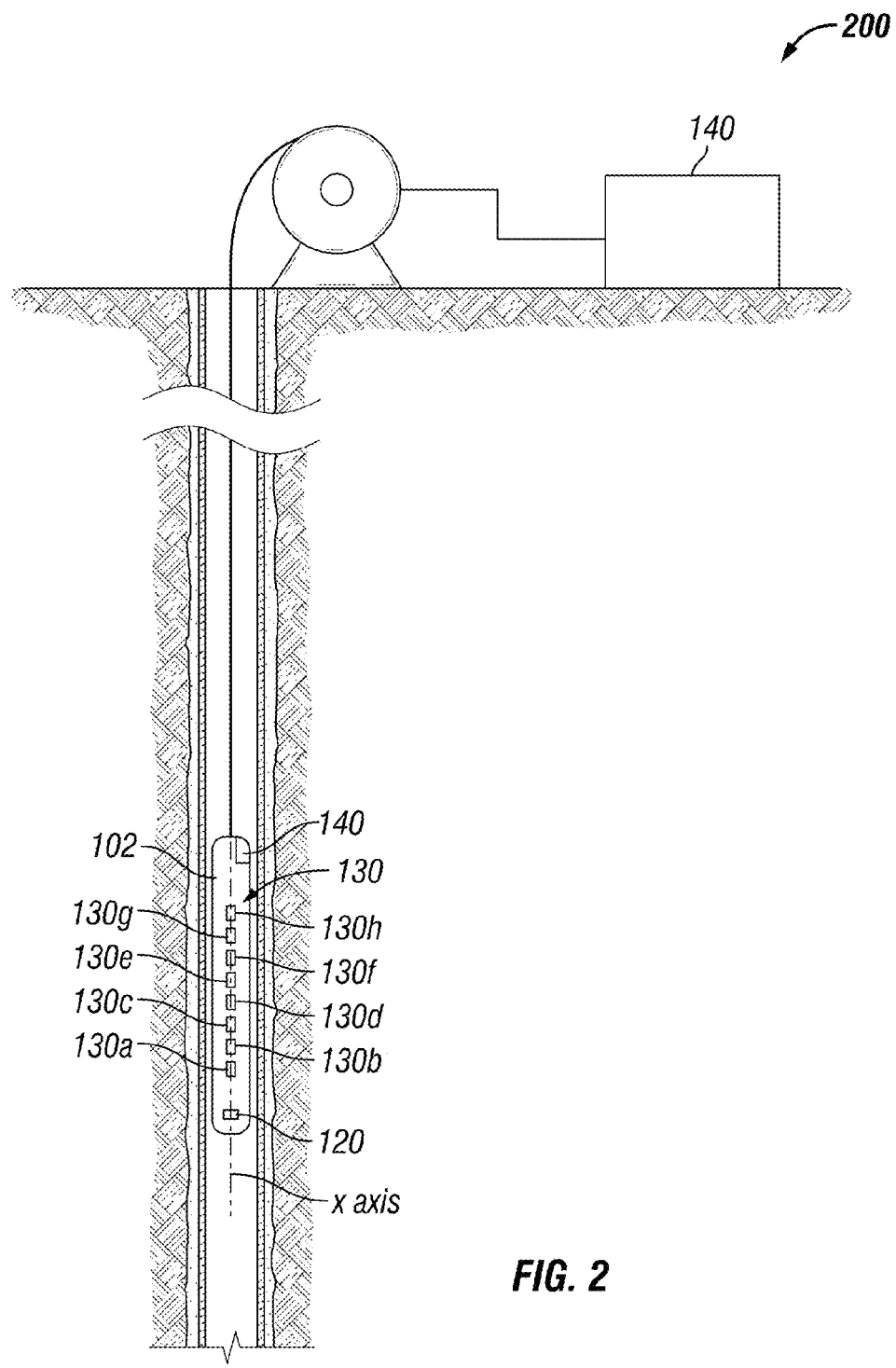
FIG. 2 is a schematic of the ultrasonic cement evaluation tool.

Details of the acoustic tool 102 are seen in FIG. 2. In particular, in one embodiment, acoustic tool 102 employs a pitch-catch configuration whereby at least one transmitting ultrasonic transducer 120 and at least one receiving ultrasonic transducer 130 are utilized. Tool 102 may include a processing system 140 that can be coupled to the transmitting transducer(s) for controlling the firing of the transmitting transducer(s). The processing system 140 may also be coupled to the receiving transducer(s) for processing the signals received by the receiving transducer(s). Alternatively, or in addition, a processing system may be located uphole. The downhole and/or uphole processing system may be a computer programmed to control the transmitting transducer and programmed to process the received signals as detailed hereinafter. Alternatively, the downhole and/or uphole processing system may comprise a digital signal processor (DSP) or other dedicated circuitry adapted to conduct the desired functions, as further described below.

In FIG. 2, a single transmitting ultrasonic transducer 120 and an array of eight receiving ultrasonic transducers 130a-130h are shown, although more transmitting transducers can be utilized and fewer or more receiving transducers may be utilized. In one embodiment, the ultrasonic receiving transducers 130a-130h are spaced 10 mm apart from each other along an axis parallel to a longitudinal axis ("x axis") of the tool 102. In another embodiment, the transducers are spaced between 5 mm and 30 mm apart from each other. In one embodiment, the ultrasonic transmitting transducer is spaced at 100 mm from the closest receiving transducer. In another embodiment, the ultrasonic transmitting transducer is spaced between 50 mm and 500 mm from the closest receiving transducer. In another embodiment, two ultrasonic transmitting transducers are spaced between 50 mm and 500 mm from each other. In another embodiment, the spacing between the transmitting and receiving transducers may be controllably changed.

In one embodiment, the transmitting ultrasonic transducer 120 generates waves covering a portion of the frequency range of between 20 kHz to 1 MHz. In another embodiment, the transmitting ultrasonic transducer 120 generates waves in the frequency range covering 100 kHz to 500 kHz.

In one embodiment, both the transmitting and receiving transducers are angled relative to the transverse axis of the casing at an angle of between 28 and 35 degrees and in opposite directions. In another embodiment, both the transmitting and receiving transducers are angled relative to the transverse axis of the casing at an angle of between 20 and 25 degrees and in opposite directions. In another embodiment, both the transmitting and receiving transducers may be controllably angled at desired angles relative to the transverse axis of the casing. In one embodiment, the array of transmitting and receiving transducers rotate at specific rates to scan a cased borehole and may thereby acquire signals at multiple azimuths for each depth.

In one embodiment, an array of transmitting transducers is spaced azimuthally around the tool, and an array of receiving transducers is similarly spaced azimuthally around the tool. In one embodiment, the array of receiving transducers comprises a two-dimensional array of receivers spaced azimuthally and longitudinally (axially).

Figure 3:
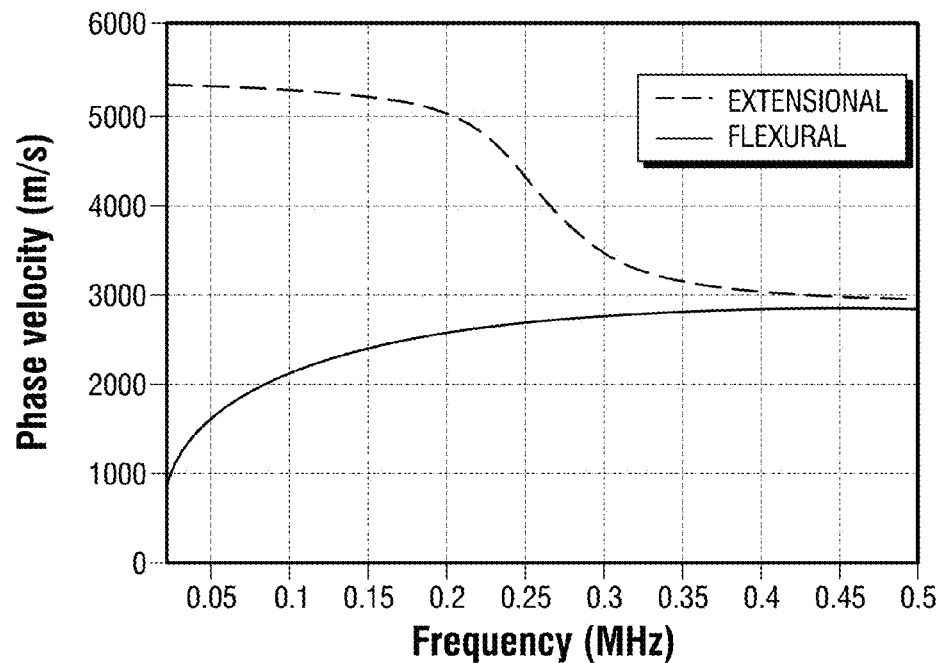
FIG. 3 is a plot of phase velocity versus frequency showing dispersion characteristics of flexural and extensional modes of a steel plate in water.

According to one aspect, when an ultrasonic transmitting transducer generates a signal in a cased borehole, ultrasonic acoustic energy enters the borehole fluid and the casing is transferred to the cement sheath (if present) via a casing propagating wave. At every frequency, Snell's law requires that the axial (ie, longitudinal) slowness be the same in the borehole fluid, the steel layer, and the cement medium. Hence, considering the flexural mode only in the casing propagating waves, $$\frac{\sin\{\theta(\omega)\}}{v_{fluid}} = \frac{1}{v_{flex}(\omega)} = \frac{\sin\{\theta_{P,S}(\omega)\}}{v_{P,S}} \quad (1)$$

where $v_{P,S}$, refers to either the P (compressional) or S (shear) wavespeed in the cement with corresponding angles $\theta_{P,S}$, measured with respect to the transverse to the casing. The characteristics of $v_{flex}$ flexural mode velocity are imposed by the steel casing elastic properties and thickness, and it is known that this velocity is dispersive. FIG. 3 shows the dispersion of the casing flexural and extensional modes for a 0.375 inch thick steel plate in water which may be used to approximate a cylindrical casing in a high-frequency range of interest. As seen in FIG. 3, the flexural phase velocity increases from approximately 1000 m/s at low frequencies to approximately 2800 m/s at 350 kHz and beyond, while the extensional phase velocity decreases from approximately 5200 m/s at low frequencies and approaches the 2800 m/s at 500 kHz. It is known that these values increase and decrease with changes in the casing thickness and sound speed in the fluid surrounding the casing.

Considering equation (1), it is evident that for the casing flexural mode to radiate a propagating wave inside the cement sheath as a bulk wave, its angle $\theta_{P,S}$ must be real. This imposes the condition that the cement wave speed be smaller than the frequency-dependent flexural phase velocity; $v_{P,S} < v_{flex}$. When this condition is not satisfied, the radiated waves evanesce in the cement sheath and propagate along the casing-cement interface while interacting with the casing propagating flexural mode and radiating acoustic energy back to the fluid where the receiving transducers are located.

Figure 4:
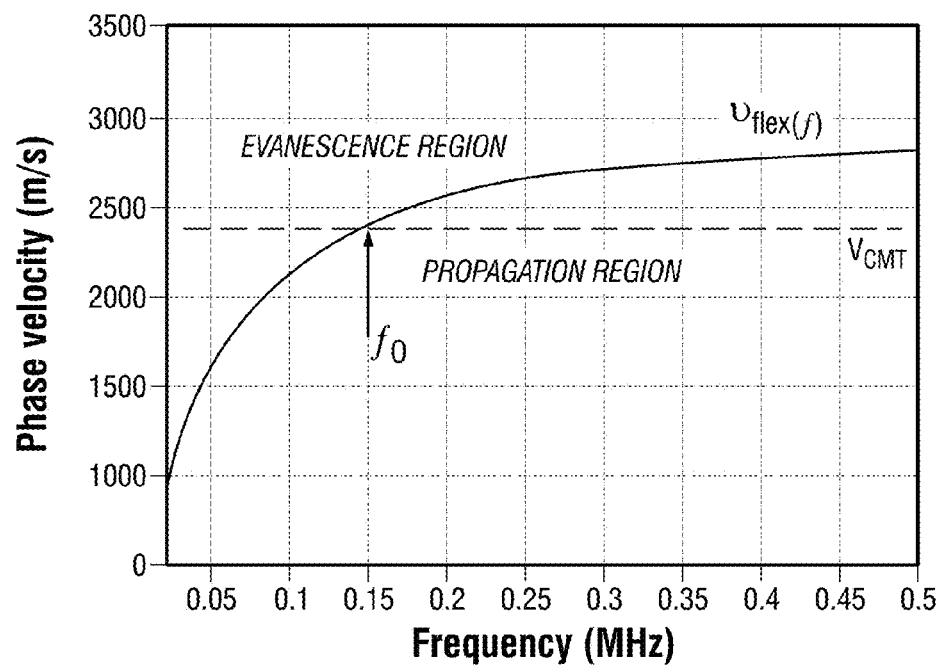
FIG. 4 is a plot of phase velocity versus frequency showing dispersional characteristics of a flexural mode of a steel plate and resulting propagation and evanescent regions with respect to a cement wavespeed.

For the flexural mode, two regions in the frequency-velocity dispersion plane can be defined with respect to wave propagation in the cement sheath; one for wave propagation and the other for wave evanescence. This is seen in FIG. 4 which also shows the intersection of the dispersion curve with a horizontal line corresponding to a given wavespeed $v_{cmt}$ in the cement and which indicates the transition frequency $f_0$ above which (i.e., $f > f_0$) there is propagation and below which (ie, $f < f_0$) there is evanescence. It should be noted that this interpretation applies to a plane wave. For a pulsed beam comprised of a spectrum of pulsed plane waves, the transition region in the frequency domain is not as abrupt.

Understanding the theory, a simulation code was utilized to generate an array of waveforms simulating a pitch-catch measurement with a receiver array. Details of the simulation code can be found in, for example, S. Zeroug, "Analytical Modeling for Fast Simulations of Ultrasonic Measurements on Fluid-Loaded Layered Elastic Structures," *IEE Trans. on Ultrasonics, Ferroelectrics, and Frequency Control*, Vol. 47, No. 3 (May 2000) and S. Zeroug, "Forward Modeling for Ultrasonic Leaky Lamb-wave Based Imaging through a Highly Contrasting Steel Cylindrical Layer," 2004 *IEEE Symposium on Ultrasonics*, pg. 672-675, Vol. 1. Parameters included: 25.4 mm transducer stand-off from the casing; transducer alignment angle of either 35, 30, or 25 degrees as specified; transducer aperture width of approximately 25 mm; transmitter-receiver spacing array=150 mm with transducers spaced 12.5 mm apart up to a distance of 400 mm; casing thickness of 9.525 mm; fluid velocity $V_f$=1500 m/s unless specified otherwise; density of fluid=1000 kg/m$^3$; steel $V_p$=5880 m/s; steel $V_s$=3220 m/s; steel density=7800 kg/m$^3$; cement $V_p$ and $V_s$ as specified; cement density=1900 kg/m$^3$; and cement thickness=infinity. The generated waveforms were then processed with a modified matrix pencil algorithm (also known as TKO) to generate dispersion plots. The TKO is described in more detail in M. Ekstrom, "Dispersion Estimation from Borehole Acoustic Arrays Using a Modified Matrix Pencil Algorithm, *Proceedings of ASILOMAR*-29, IEEE 1996, pages 449-53, which is hereby incorporated by reference herein. Four such dispersion plots with different cement compressional and shear velocity parameters are shown as FIGS. 5a-5d.

Figure 5A:
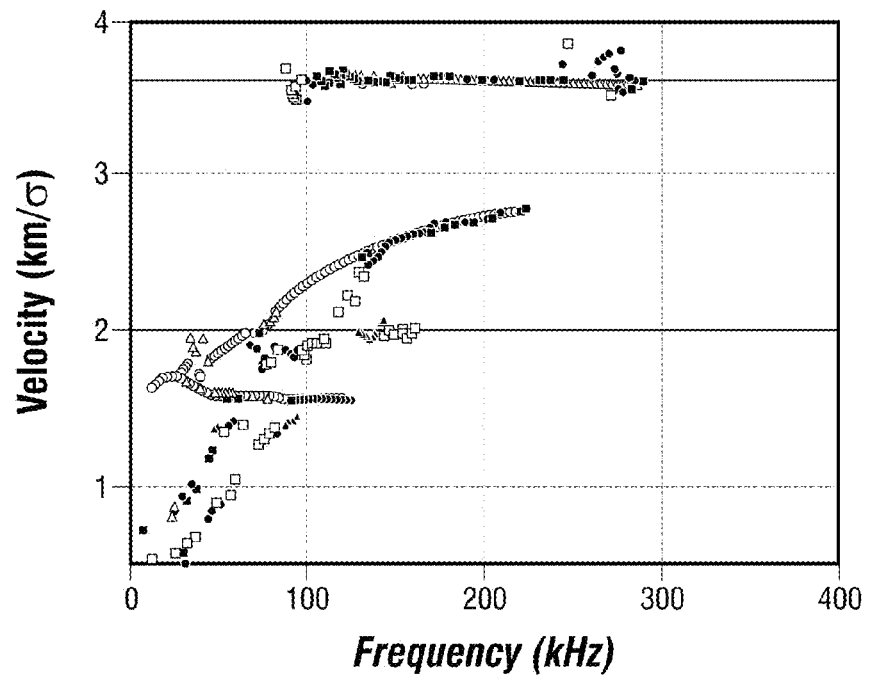
FIGS. 5a-5d are simulated plots of velocity versus frequency for dispersions of a steel casing in the presence of cements of differing compressional and shear wavespeeds.

FIGS. 5a-5d show TKO results for various cement wavespeeds, ranging from 2425 to 3625 m/s for $V_p$ and 1815 to 2215 m/s for $V_s$. In FIG. 5a where $V_p$=3625 and $V_s$=2015 m/s (note the wavespeeds are specified in units of mm/μs which is equivalent to units of km/s), a non-dispersive compressional signal of the cement at a velocity of 3625 m/s is clearly seen as a horizontal line extending from approximately 100 kHz to 280 kHz. A non-dispersive signal at about 1500 m/s representing the fluid arrival ($V_f$=1500) is likewise evident, as is a dispersive flexural mode signal of the steel (increasing from a velocity of about 1600 m/s at low frequencies to about 2800 m/s at 220 kHz). A weaker non-dispersive shear signal at about 2015 m/s may also be seen. It should be noted that for purposes herein, the term "non-dispersive" when applied to signals such as a compressional signal or a shear signal may include some "dispersive" elements, but are primarily or substantially non-dispersive.

Figure 5B:
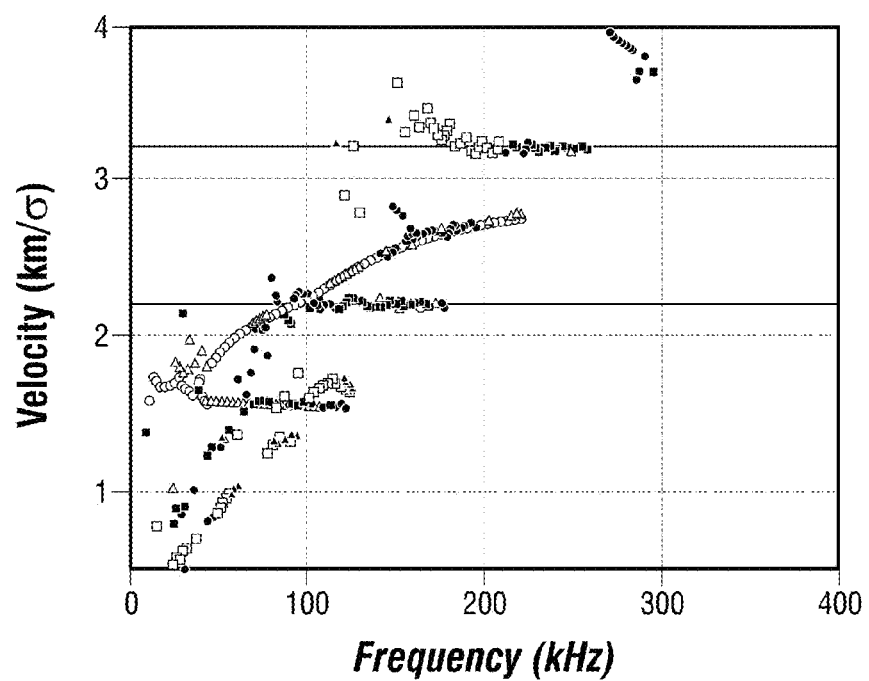

In FIG. 5b where $V_p$=3225 and $V_s$=2015 m/s, a non-dispersive compressional signal of the cement at a velocity of 3225 m/s is clearly seen as a horizontal line extending from approximately 180 kHz to 250 kHz, and a non-dispersive shear signal at about 2015 m/s is also clearly seen. A non-dispersive signal at about 1500 m/s representing the fluid arrival ($V_f$=1500) is likewise evident, as is a dispersive flexural mode signal of the steel (increasing from a velocity of about 1600 m/s at low frequencies to about 2800 m/s at 220 kHz).

Figure 5C:
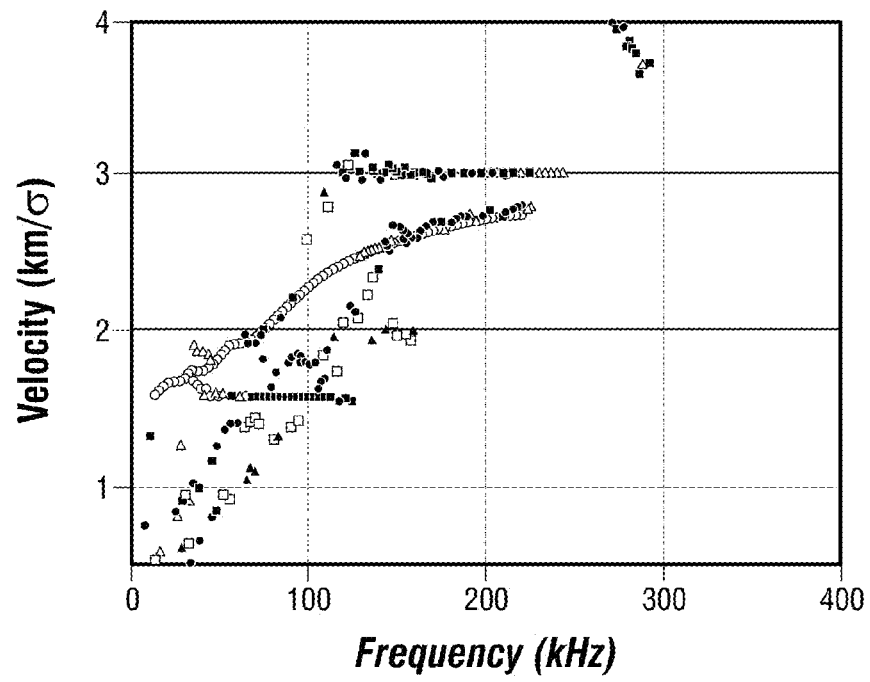

In FIG. 5c, where $V_p$=3025 and $V_s$=2015 m/s, a non-dispersive compressional signal of the cement at a velocity of 3025 m/s is clearly seen as a horizontal line extending from approximately 110 kHz to 240 kHz. A non-dispersive signal at about 1500 m/s representing the fluid arrival ($V_f$=1500) is likewise evident, as is a dispersive flexural mode signal of the steel (increasing from a velocity of about 1600 m/s at low frequencies to about 2800 m/s at 220 kHz). A non-dispersive shear signal at about 2015 m/s may be hard to identify. However, even though the non-dispersive shear signal at about 2015 m/s may be hard to identify, the presence of the non-dispersive compressional signal at a velocity of 3025 m/s confirms the model includes the presence of cement.

Figure 5D:
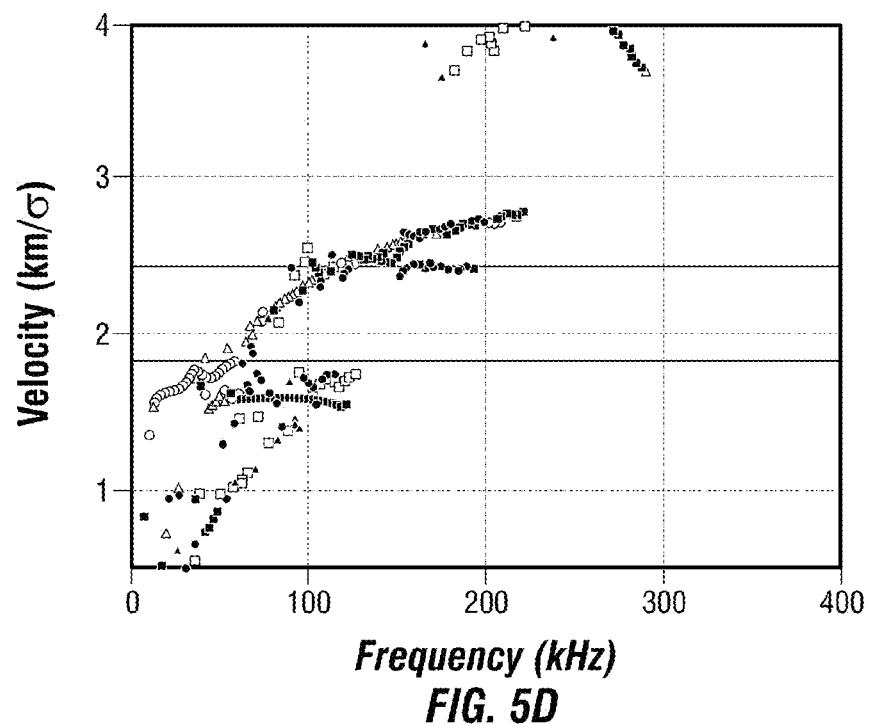

In FIG. 5d, where $V_p$=2425 and $V_s$=1815 m/s, a non-dispersive compressional signal of the cement at a velocity of 2425 m/s is seen as a horizontal line extending from approximately 100 kHz to 200 kHz. A non-dispersive signal at about 1500 m/s representing the fluid arrival ($V_f$=1500) is likewise evident, as is a dispersive flexural mode signal of the steel (increasing from a velocity of about 1600 m/s at low frequencies to about 2800 m/s at 220 kHz). Again, a non-dispersive shear signal at about 1815 m/s may be hard to identify, but the presence of the non-dispersive compressional signal at a velocity of 3025 m/s confirms the model. It is noted that while FIGS. 5a-5d do not show a situation where a non-dispersive shear signal is clearly seen and a non-dispersive compressional signal may be hard to identify, such a situation may arise, and the non-dispersive shear signal will then confirm the presence of cement.

Figure 6A:
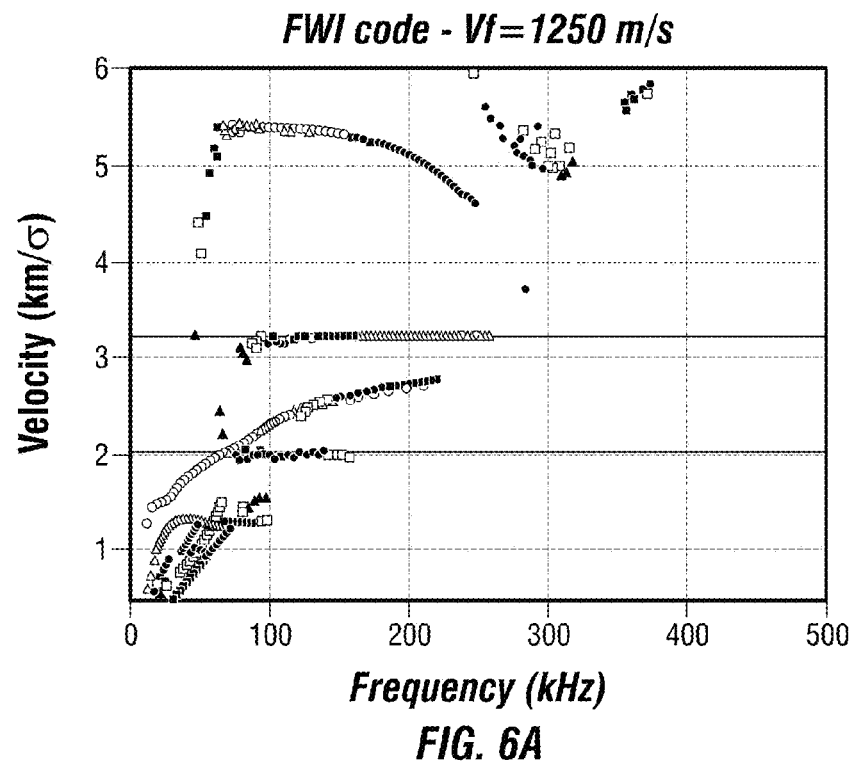
FIGS. 6a-6c are simulated plots of velocity versus frequency for dispersions of a steel casing in the presence of cement and with borehole fluids of different velocities.
Figure 6B:
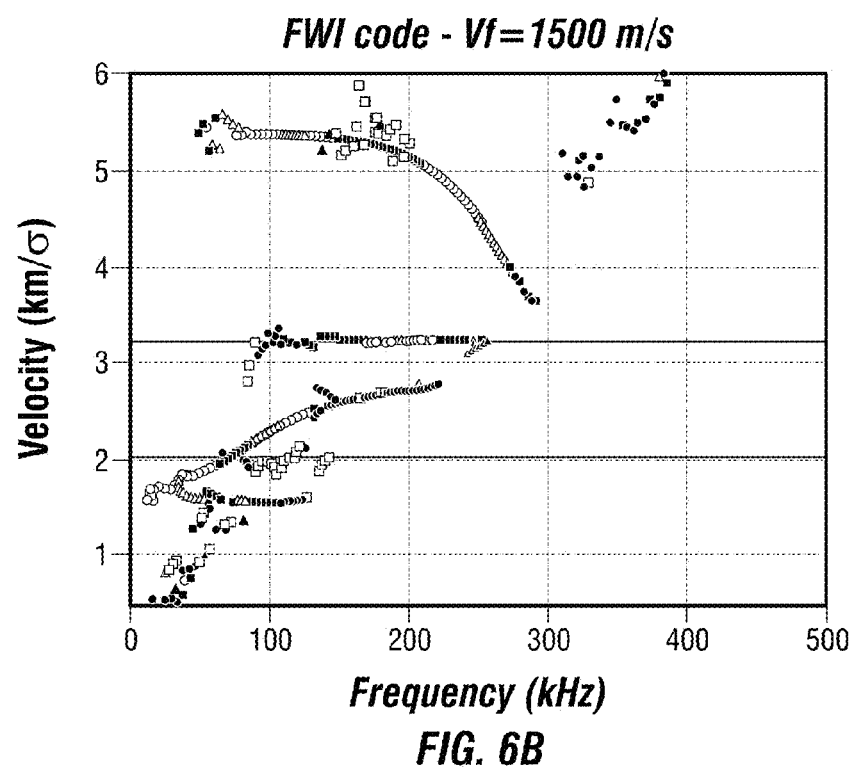
Figure 6C:
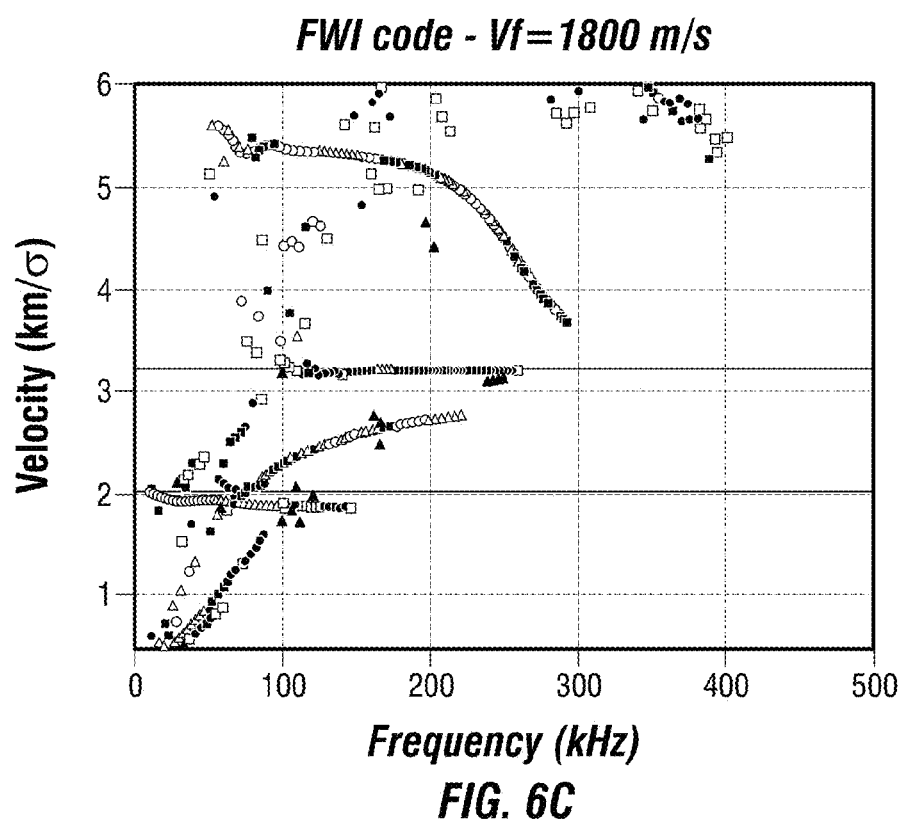

FIGS. 6a-6c show similar TKO plots for simulations where the borehole fluid wavespeed was varied, but otherwise the same parameters as used for the simulations of FIGS. 5a-5d were utilized except that the transducers were aligned at an angle of 30 degrees, and the velocity in the cement was set at $V_p$=3225 m/s and $V_s$=2015 m/s. As will be appreciated through a comparison of FIGS. 6a-6c, the headwave dispersions are insensitive to the fluid wavespeed. However, the energy of the casing quasi-Lamb modes excited at the specific transducer alignment angle of 30 degrees depends on the wavespeed. At a fluid wavespeed of 1250 m/s (FIG. 6a), the flexural mode signature having a velocity of approximately 1600 m/s at low frequencies and increasing to approximately 2600 m/s at 200 kHz is stronger (higher intensity) than the extensional mode which has a velocity of approximately 5400 m/s at 50 kHz and 4500 m/s at 250 kHz, although both are seen clearly. At a fluid wavespeed of 1500 m/s (FIG. 6b), the flexural mode is more intense than the extensional mode, although again, both are seen clearly. At a fluid wavespeed of 1800 m/s (FIG. 6c), the extensional mode becomes optimal at the expense of the flexural mode, although both are clearly evident. In all three cases, a compressional non-dispersive signal is seen at 3225 m/s, although the shear non-dispersive signal at approximately 2000 m/s is seen only in FIG. 6a. A signature of the fluid wavespeed is also seen in each of FIGS. 6a-6c, with non-dispersive signals respectively seen at wavespeeds of 1250, 1500 and 1800 m/s.

In one aspect, it will be appreciated from FIGS. 5a-5d and 6a-6c that where cement is located in the annulus between the casing and the formation, according to simulations, it should be possible to find a non-dispersive compressional and/or shear signature in a velocity/frequency plot generated by processing ultrasonic waveforms according to a modified matrix pencil algorithm. With that knowledge, experiments were performed in a laboratory and the results were processed to confirm the expectations of the simulations.

Figure 7A:
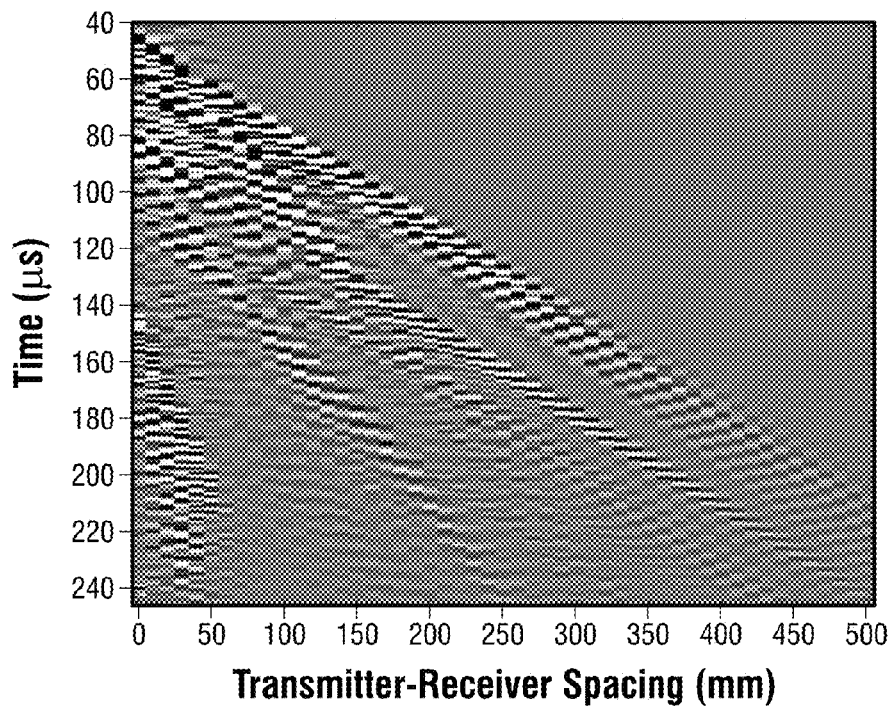
FIG. 7a is a gray-scaled plot of time versus transmitter-receiver spacing for an experimental arrangement with an ultrasonic transmitter and receiver arranged relative to a steel plate backed by a lucite block.
Figure 7B:
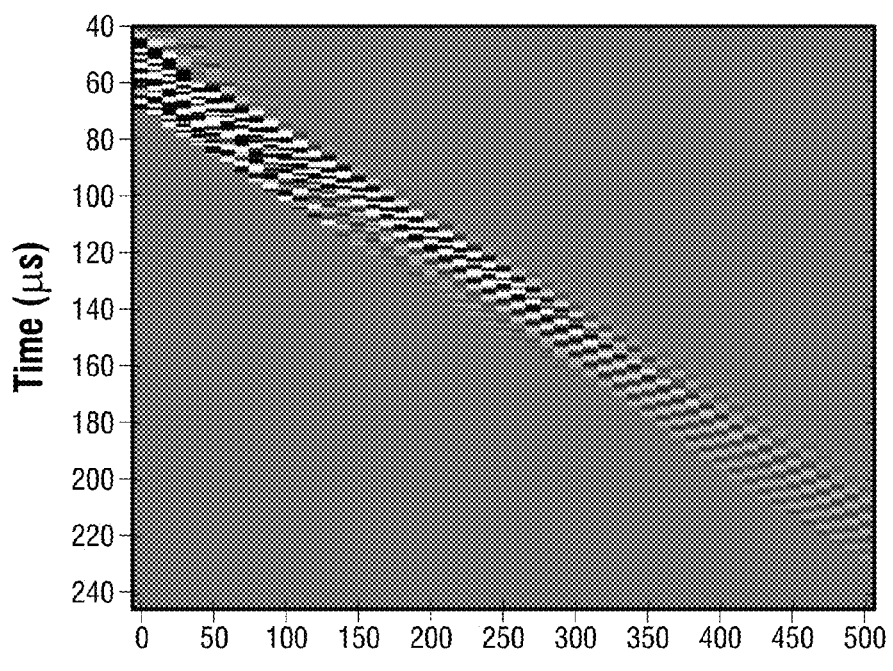
FIG. 7b is the plot of FIG. 7a filtered to remove late arrivals.

In a first experiment, two one-inch diameter ultrasonic piston transducers aligned at thirty-five degrees relative to the transverse axis of a steel plate were used in a pitch-catch mode to optimally excite the flexural mode of the steel plate which was backed by a lucite block in a water bath. The receiver was moved away from the transmitter at steps of 10 mm in order to generate an array of waveforms. FIG. 7a is a gray-scaled plot of time versus transmitter-receiver spacing for the experimental arrangement. FIG. 7b is the plot of FIG. 7a filtered to remove late arrivals.

Figure 8A:
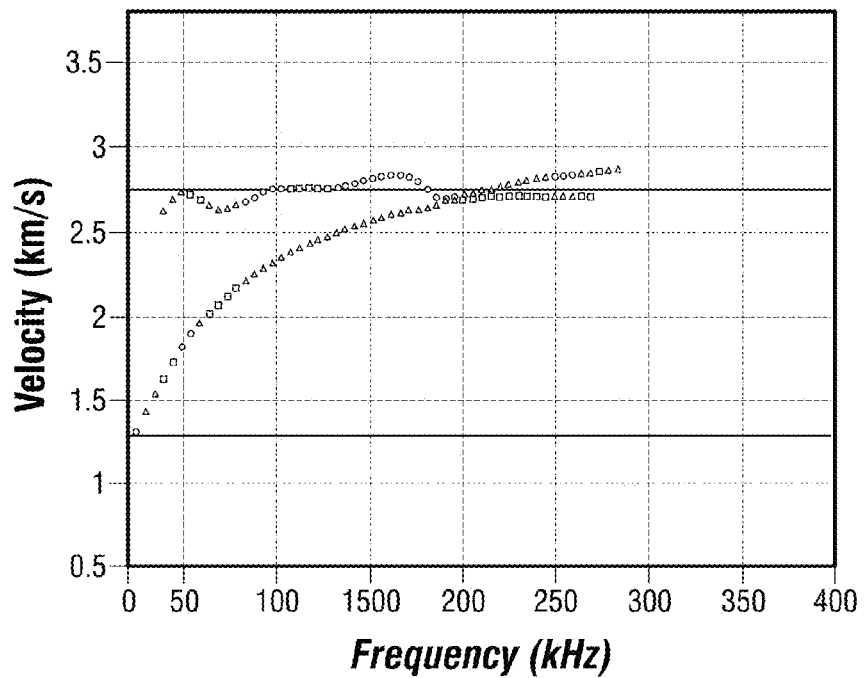
FIGS. 8a and 8b are plots of velocity versus frequency for an experimental arrangement with an ultrasonic transmitter and receiver arranged relative to a steel plate with a lucite block respectively clamped adjacent to the steel plate and clamped to the steel plate but separated by a water-filled gap.

Processing the results of FIG. 7b using TKO processing yielded the velocity-frequency plot of 8a. As seen in FIG. 8a, a dispersive flexural mode signature is generated that increases from a velocity of approximately 1300 m/s at low frequencies to over 2700 m/s at frequencies above 230 kHz. Also seen is a non-dispersive compressional wave signature at approximately 2700 m/s. The non-dispersive compressional wave signature corresponds to the compressional velocity of the lucite which is approximately 2700 m/s. Thus, FIG. 8a confirms that a non-dispersive compressional wave signature will be present and detected in the presence of a solid substance in an annulus behind a metal object.

Figure 8B:
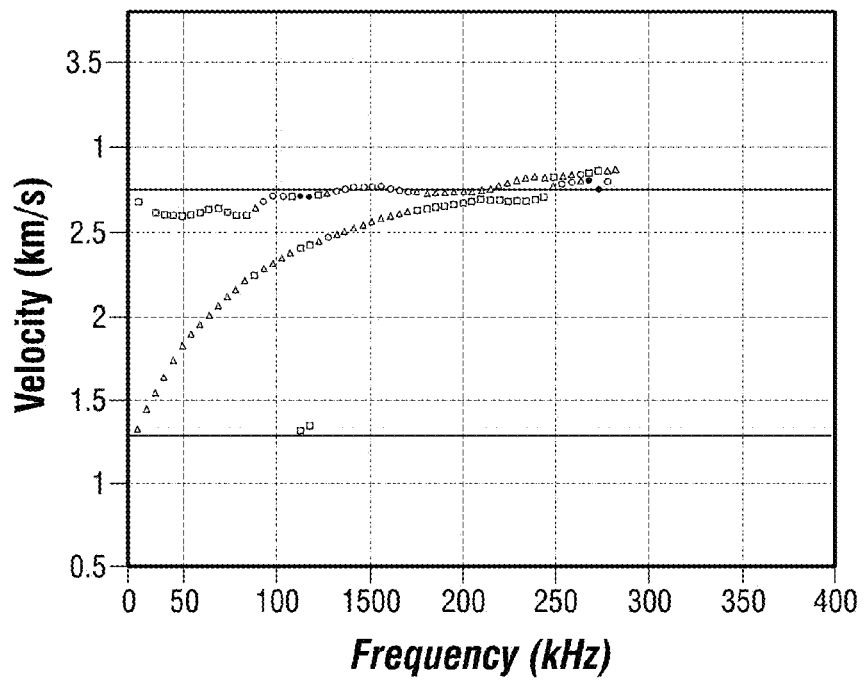

FIG. 8b is similar to FIG. 8a and relates to an experiment that was identical to the experiment of FIG. 8a except that the lucite block was separated from the steel plate by a 250 micrometer-thick water-filled gap. Again, a dispersive flexural mode signature and a compressional wave signature are evident with the compressional wave signature hovering around 2700 m/s. The results of FIG. 8b show that even where there is a gap between the material and the metal, a compressional wave signature that can identify the wavespeed of that material can be found.

Figure 9:
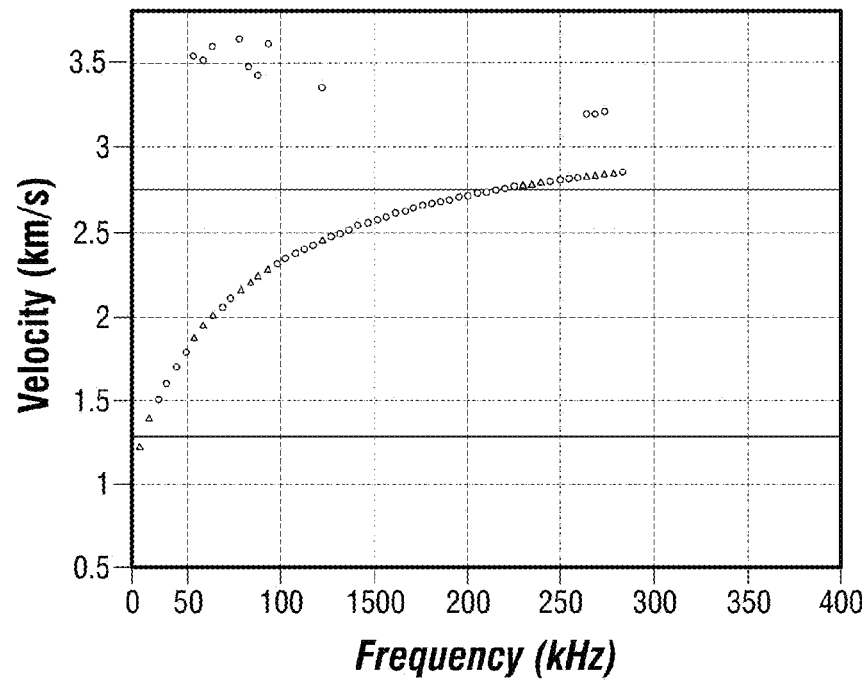
FIG. 9 is a plot of velocity versus frequency for an experimental arrangement with an ultrasonic transmitter and receiver arranged relative to a steel plate immersed in water.

FIG. 9 is a plot of velocity versus frequency for an experimental arrangement such as described above with reference to FIGS. 8a and 8b, except that instead of backing the metal plate with lucite, the lucite was removed and the steel plate was immersed totally in water. In FIG. 9, a flexural dispersion curve is seen. However, no non-dispersive signature can be found. Thus, FIG. 9 confirms that in the absence of solid material behind the metal plate, non-dispersive signatures will not be seen.

Figure 10A:
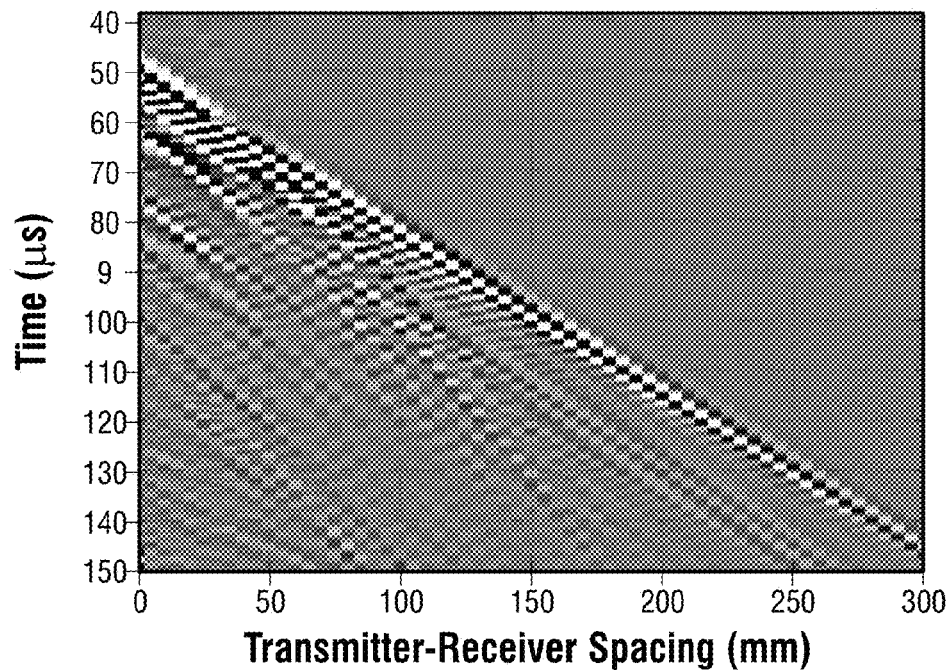
FIG. 10a is a gray-scaled plot of time versus transmitter-receiver spacing for an experimental arrangement with an ultrasonic transmitter and receiver arranged relative to a steel casing cemented in a clay pipe.
Figure 10B:
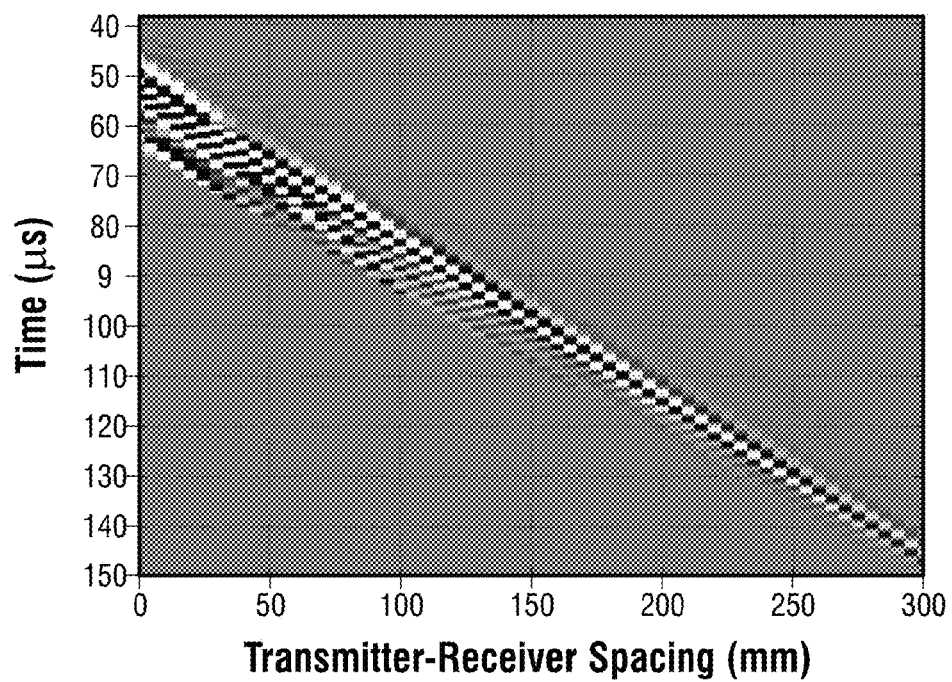
FIG. 10b is the plot of FIG. 10a filtered to remove late arrivals.

In another experiment, a 6.625 inch outer-diameter cylindrical steel casing to which an 8 inch internal diameter clay pipe (representing a formation) was cemented with a cement having a shear wavespeed of 1950 m/s was placed in a water tank. Two one-inch diameter piston ultrasonic transducers were used in the water bath in a pitch-catch mode to excite predominantly the casing flexural mode. The receiving transducer was moved away from the transmitter at intervals of 5 mm. FIG. 10a is a gray-scaled plot of time versus transmitter-receiver spacing for the experimental arrangement. FIG. 10b is the plot of FIG. 10a filtered to remove late arrivals.

Figure 11:
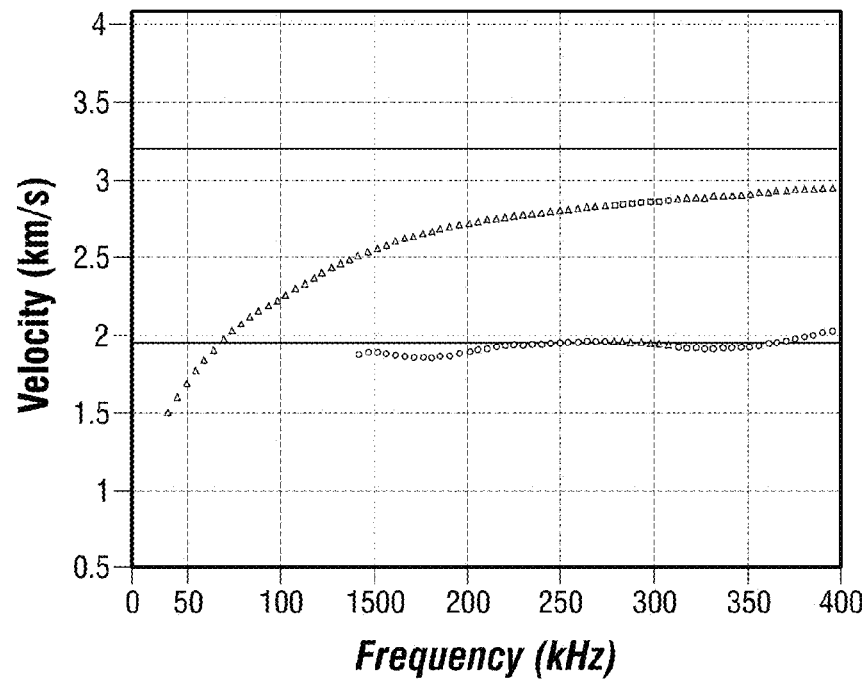
FIG. 11 is a plot of velocity versus frequency generated as a result of processing the results of FIG. 10b.

The results of FIG. 10b were processed using TKO processing to yield the plot of velocity versus frequency seen in FIG. 11. As will be appreciated, a dispersive flexural mode signature is generated that increases from a velocity of approximately 1500 m/s at low frequencies to a velocity of over 2800 m/s at frequencies of 300 kHz and more. In addition, a non-dispersive shear wave signature was generated at a velocity of approximately 1950 m/s corresponding to the shear wavespeed of the cement. It can be assumed that the non-dispersive wave signature is the shear wave. Thus, FIG. 11 confirms that a substantially non-dispersive wave signature of a material behind a round metal casing will be present and detectable. Bulk wave propagation in the cement sheath and/or in the borehole fluid can also be dispersive if this is an inherent property of the cement material and/or the borehole fluid.

While the experiments described above with reference to FIGS. 7-11 utilized a transmitter and receiver that were angled relative to a metal plate or casing in order to optimize the excitation and detection of the quasi-Lamb flexural mode, it will be appreciated that they could have been arranged (e.g., angled differently) to optimize other modes such as the extensional mode. Also, while the experiments described above with reference to FIGS. 7-11 utilized a receiver that was moved away from a transmitter, it will be appreciated that different arrangements could have been utilized to generate desired waveforms. For example, an array of fixed receivers could have been utilized. Alternatively, an array of transmitters could have been utilized. As another alternative, a plurality of receivers and transmitters could have been utilized. Also, where the receiver(s) and/or the transmitter(s) is/are movable, they could be moved toward or away from each other.

In one aspect, in order to obtain information circumferentially about the casing, the tool with the ultrasonic transmitter(s) and receiver(s) can be rotated. Alternatively, azimuthally arranged arrays of transmitters and receivers could be utilized.

Figure 12:
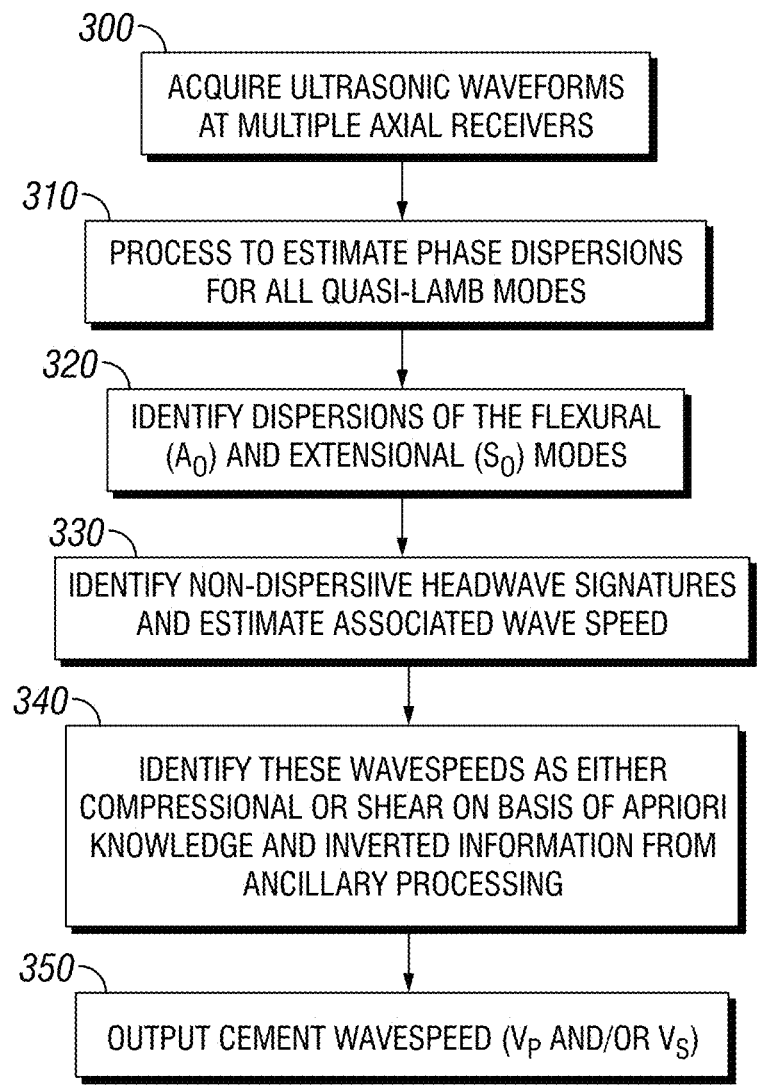
FIG. 12 is a flow chart of a first method of determining the presence of cement in an annulus and finding the wavespeed of that cement.

FIG. 12 is a flow chart of one method of determining the presence of cement in an annulus and finding the wavespeed(s) associated with that cement. At 300, ultrasonic waveform indications are acquired from one or more receivers that have received signals in a borehole at different transmitter-receiver axial distances. If desired, the acquired waveform indications may be filtered by a processing system to remove late-received signals. Alternatively, the waveform indications could have been filtered by the receivers. At 310, the waveform indications are processed by a processing system configured to generate a velocity-frequency dispersion. In one embodiment, the dispersion generated is represented by a plot. In another embodiment, the dispersion may be represented by a table or in another manner. In one embodiment, the waveform indications are processed using a modified matrix pencil algorithm (TKO processing technique). In another embodiment, the waveform indications are processed using one or more techniques such as reported in Aeron, S. and Velero, H. P., "Automatic dispersion extraction using continuous wavelet transform," IEEE International Conference on Acoustics, Speech and Signal Processing, Las Vegas, Nev. (2008); Prosser, W. H., and Seale, M. D., "Time frequency analysis of the dispersion of Lamb modes," Journal of Acoustical Society of America, 105(5) pp. 2669-2676 (1999); and Roueff, A. et al., "Dispersion estimation from linear array data in the time-frequency plane," IEEE Transactions on Signal Processing, 53(1) pp. 3738-3780 (2005). At 320, flexural and extensional mode dispersions are optionally identified. The flexural and extensional mode dispersion signatures may be used to determine information about the steel casing. At 330, if no non-dispersive headwave signatures are present, it is concluded that either there is no cement in the annulus behind the casing at the location of interest or the parameters used in 300, 310, and 320, are not optimal enough to detect these signatures. However, if non-dispersive headwave signatures are present, their associated wavespeeds are identified. At 340 these wavespeeds are identified as compressional or shear on the basis of prior knowledge and/or on the basis of ancillary processing. As an example of prior knowledge, when cement is poured around a casing, estimates of the compressional and shear wavespeeds of the cement are generally known for example from direct measurements on an identical cement formulation performed in the laboratory or at the wellsite prior to the cementing job. Thus, when a non-dispersive headwave signature at a particular wavespeed is identified, it can often be matched to a known compressional wavespeed or a known shear wavespeed of the cement utilized in the annulus. As an example of ancillary processing, other measurements such as pulse-echo may be utilized to obtain an estimation of the acoustic impedance of the cement which, in turn, is the product of the cement density times the compressional velocity. If an estimation of cement density is also known, an approximate estimation of the compressional velocity may be obtained, and if the non-dispersive headwave signature is similar to the estimated compressional velocity, it may be assumed that the non-dispersive headwave is providing the compressional velocity. If, on the other hand, the estimated compressional velocity is faster than the non-dispersive headwave signature wavespeed, the non-dispersive headwave signature may be assumed to be the shear wave signature. In any event, the cement compressional wavespeed $V_p$ and/or the cement shear wavespeed $V_s$ are output at 350. The output may be on tangible medium such as paper or may be provided as information on a computer monitor or other electronic medium.

It will be appreciated that the flow chart of FIG. 12 may be carried out at a plurality of locations in a borehole, either by continuously moving a borehole tool in the borehole or by locating the borehole tool at desired stations. It will also be appreciated that the flow chart of FIG. 12 may be carried out for multiple rotational orientations at a single depth in a borehole by either rotating the tool or by providing circumferentially spaced transmitters and receivers and conducting the method at each desired circumferential location.

Figure 13:
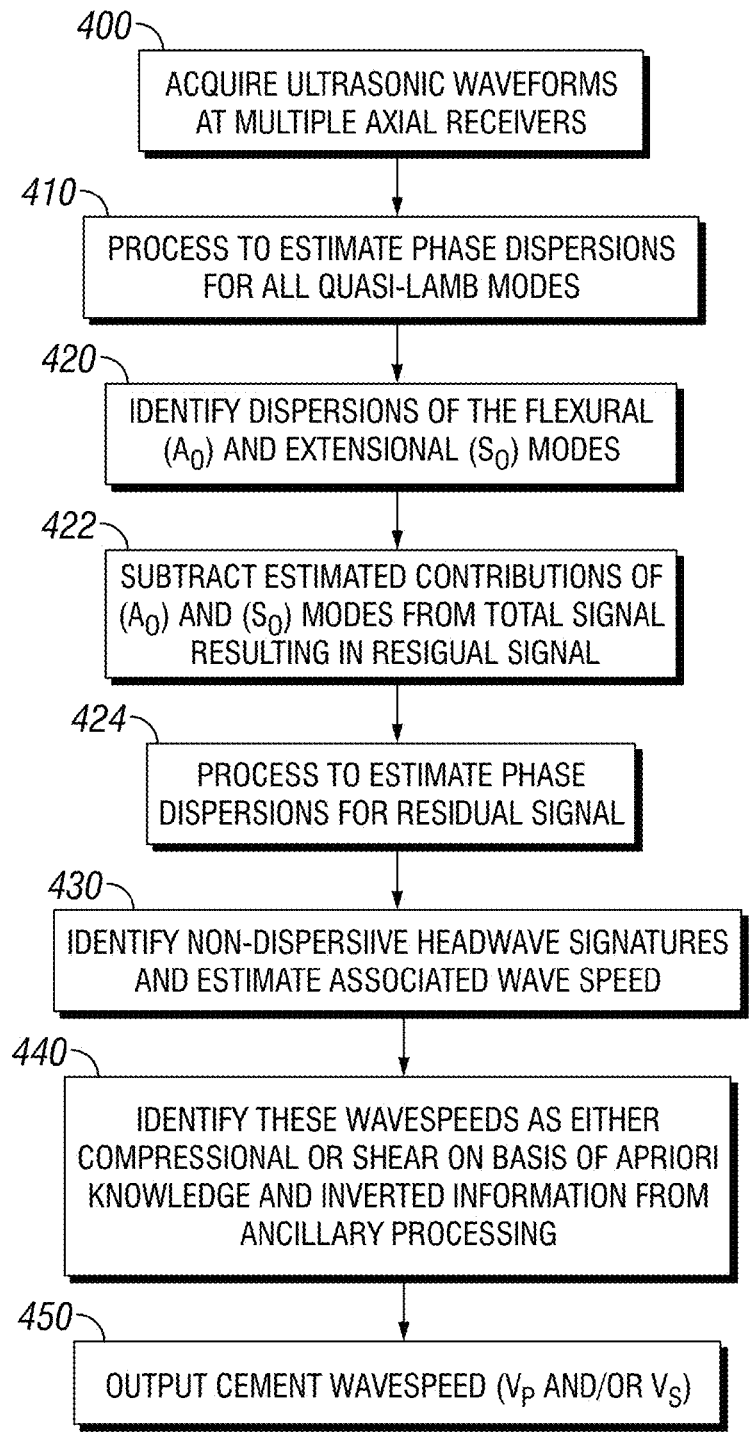
FIG. 13 is a flow chart of another method of determining the presence of cement in an annulus and finding the wavespeed of that cement.

FIG. 13 is a flow chart of another method of determining the presence of cement in an annulus and finding the wavespeed(s) associated with that cement. At 400 ultrasonic waveform indications are acquired from one or more receivers that have received signals in a borehole at different transmitter-receiver axial distances. If desired, the acquired waveform indications may be filtered by a processing system to remove late-received signals. Alternatively, the waveform indications could have been filtered by the receivers. At 410, the waveform indications are processed by a processing system to generate a velocity-frequency dispersion plot. In one embodiment, the waveform indications are processed using a modified matrix pencil algorithm (TKO processing technique). In another embodiment, the waveform indications are processed using previously referenced techniques (see Aeron, S. and Velero, H. P., "Automatic dispersion extraction using continuous wavelet transform," IEEE International Conference on Acoustics, Speech and Signal Processing, Las Vegas, Nev. (2008); Prosser, W. H., and Seale, M. D., "Time frequency analysis of the dispersion of Lamb modes," Journal of Acoustical Society of America, 105(5) pp. 2669-2676 (1999); and Roueff, A. et al., "Dispersion estimation from linear array data in the time-frequency plane," IEEE Transactions on Signal Processing, 53(1) pp. 3738-3780 (2005)). At 420, flexural and/or extensional mode dispersions (and other dispersive modes, if present) are identified. At 422, the estimated contribution of the flexural and/or extensional mode dispersions (and other casing dispersive modes, if present) are subtracted from the (optionally filtered) signal to generate a residual signal. At 424, the residual signal is processed using a modified matrix pencil algorithm (TKO processing technique) or other processing method to generate a residual signal velocity-frequency dispersion plot. At 430, if no non-dispersive headwave signatures are present in the residual signal velocity-frequency dispersion plot, it is concluded that there is no cement in the annulus behind the casing at the location of interest. However, if non-dispersive headwave signatures are present, their associated wavespeeds are identified. At 440 these wavespeeds are identified as compressional or shear on the basis of prior knowledge and/or on the basis of ancillary processing as discussed above with reference to the method of FIG. 12. The cement compressional wavespeed $V_p$ and/or the cement shear wavespeed $V_s$ are output at 450. The output may be on tangible medium such as paper or may be provided as information on a computer monitor or other electronic medium.

It is noted that the method of FIG. 13 may locate non-dispersive headwaves where the non-dispersive headwave signals are relatively small in amplitude relative to the amplitude of the dispersive mode signals.

The flow chart of FIG. 13 may be carried out at a plurality of locations in a borehole, either by continuously moving a borehole tool in the borehole or by locating the borehole tool at desired stations. Also, the flow chart of FIG. 13 may be carried out for multiple rotational orientations at a single depth in a borehole by either rotating the tool or by providing circumferentially spaced transmitters and receivers and conducting the method at each desired circumferential location.

Figure 14:
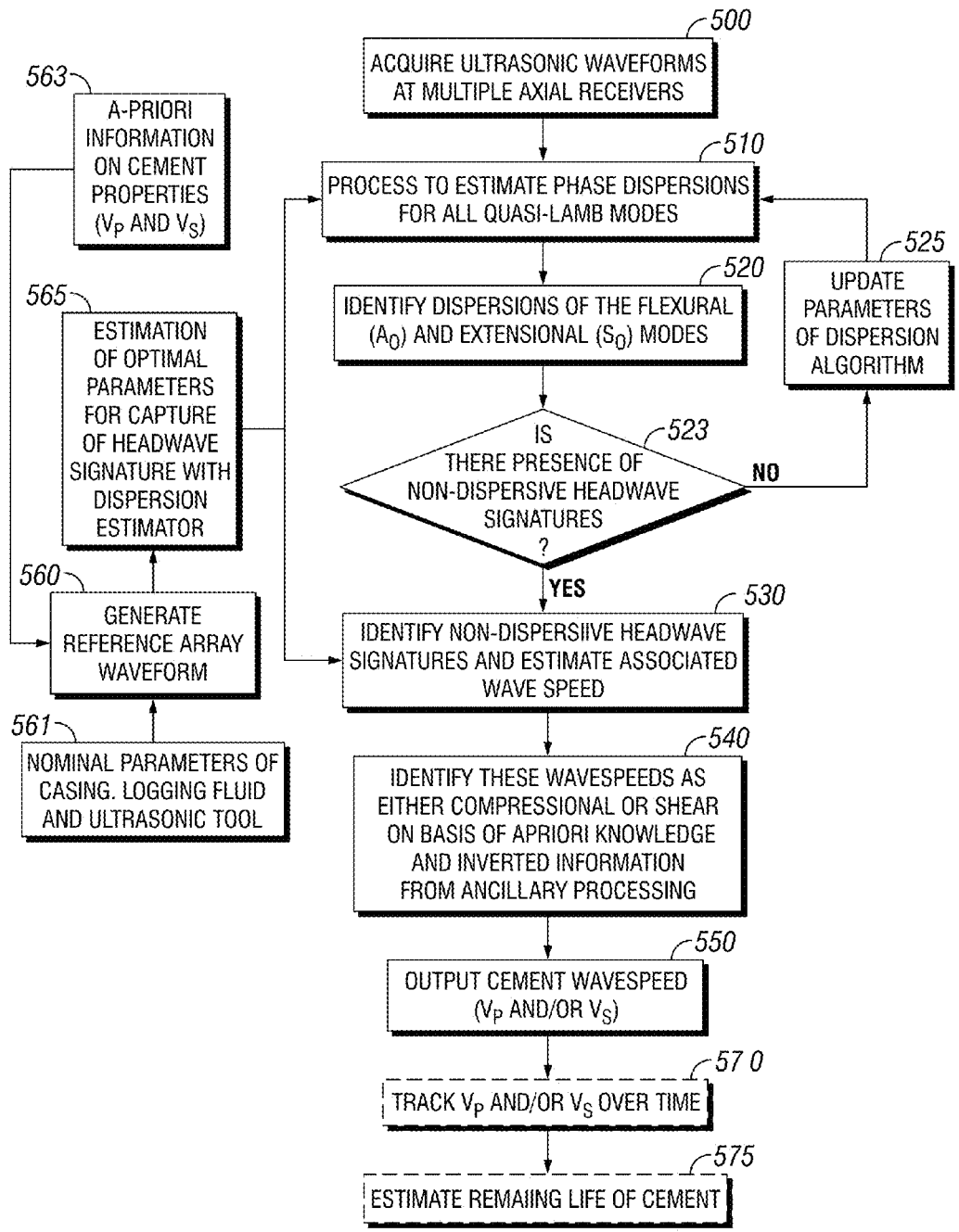
FIG. 14 is a flow chart of another method of determining the presence of cement in an annulus and finding the wavespeed of that cement.

Turning to FIG. 14, a flow chart of another method of determining the presence of cement in an annulus and finding the wavespeed(s) of that cement is provided. At 500 ultrasonic waveform indications are acquired from one or more receivers that have received signals in a borehole at different transmitter-receiver axial distances. If desired, the acquired waveform indications may be filtered by a processing system to remove late-received signals. Alternatively, the waveform indications could have been filtered by the receivers. At 510, the waveform indications are processed by a processing system to generate a velocity-frequency dispersion plot. In one embodiment, the waveform indications are processed using a modified matrix pencil algorithm (TKO processing technique). In another embodiment, the waveform indications are processed using the previously referenced techniques (see, Aeron, S. and Velero, H. P., "Automatic dispersion extraction using continuous wavelet transform," IEEE International Conference on Acoustics, Speech and Signal Processing, Las Vegas, Nev. (2008); Prosser, W. H., and Seale, M. D., "Time frequency analysis of the dispersion of Lamb modes," Journal of Acoustical Society of America, 105(5) pp. 2669-2676 (1999); and Roueff, A. et al., "Dispersion estimation from linear array data in the time-frequency plane," IEEE Transactions on Signal Processing, 53(1) pp. 3738-3780 (2005)). At 520, flexural and/or extensional mode dispersions (and other dispersive modes, if present) are identified. At 523, a determination is made as to whether non-dispersive headwave signatures are present. If not, the parameters of the dispersion algorithm utilized to process the waveforms at 510 are updated at 525, the waveform indications are processed again at 510, the flexural and/or extensional mode dispersions are identified again at 520, and another attempt is made at 523 to determine the presence of non-dispersive headwave signatures. Ultimately, if no non-dispersive headwave signature is located, a determination is made that there is no cement behind the casing at the location of interest or the parameters used in 500 to 525, are not optimal enough to detect these signatures. However, if the presence of one or more non-dispersive headwave signatures are found, they are identified at 530, and their associated wavespeeds are identified. At 540 these wavespeeds are identified as compressional or shear on the basis of prior knowledge and/or on the basis of ancillary processing as discussed above with reference to the method of FIG. 12. The cement compressional wavespeed $V_p$ and/or the cement shear wavespeed $V_s$ are output at 550. The output may be on tangible medium such as paper or may be provided as information on a computer monitor or other electronic medium.

In one aspect, in order to help with the processing of the waveforms and in order to help in identifying non-dispersive headwave signatures and associated wavespeeds, at 560, reference array waveforms are generated using nominal parameters of the casing, logging fluid and the ultrasonic tool 561 and prior information of cement properties 563 such as $V_p$ and $V_s$. The reference array waveforms are used to generate an estimation of optimal parameters for the capture of a headwave signature with a dispersion estimator 565. For instance, TKO or similar methods are used and their processing parameters tuned until non-dispersive signatures appear with enough evidence. The final set of processing parameters are then used in 510.

In another aspect, as shown in FIG. 14, the cement wavespeed(s) determined at 550 optionally may be tracked over time at 570. The information gained by performing the measurement over time (e.g., months or years) may then be used for one or more purposes such as estimating the remaining useful life of the cement job 575. It will be appreciated that the cement wavespeed(s) determined in conjunction with the methods of FIGS. 12 and 13 may likewise be tracked over time, and the information gained over time may be used for one or more purposes such as estimating the remaining useful life of the cement sheath.

It will be appreciated that the flow chart of FIG. 14 may be carried out at a plurality of locations along a length of the borehole, either by continuously moving a borehole tool which is suspended in fluid in the borehole or by locating the borehole tool at desired stations. A resulting log may then be generated of the presence or absence of cement along a length of a borehole casing as well as, where available, the compressional and/or shear velocities of the cement if present. It will also be appreciated that the flow chart of FIG. 14 may be carried out for multiple rotational orientations at a single depth in a borehole by either rotating the tool or by providing circumferentially spaced transmitters and receivers and conducting the method at each desired circumferential location. A resulting azimuthal log may then be generated of the presence or absence of cement (circumferentially) about the borehole casing as well as, where available, the compressional and/or shear velocities of the cement if present.

In one aspect, the term "processing system" should not be construed to limit the embodiments disclosed herein to any particular device type or system. The processing system may be a laptop computer, a desktop computer, or a mainframe computer. The processing system may also include a processor (e.g., a microprocessor, microcontroller, digital signal processor, or general purpose computer) for executing any of the methods and processes described above (e.g., processes 310-350 in FIG. 12, processes 410-450 in FIG. 13, and processes 510-575 in FIG. 14). The processing system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. This memory may be used to store, for example, ultrasonic waveforms, wavespeeds, and/or instructions for performing the processes described above.

Any of the methods and processes described above (e.g., processes 310-350 in FIG. 12, processes 410-450 in FIG. 13, and processes 510-575 in FIG. 14) can be implemented as computer program logic for use with the processing system. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the processing system. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

There have been described and illustrated herein several embodiments of methods of evaluating the presence and properties of cement located behind a casing in a borehole utilizing ultrasonic signal testing. While particular embodiments and aspects have been described, it is not intended that the disclosure be limited thereto, and it is intended that the claims be as broad in scope as the art will allow and that the specification be read likewise. Thus, while particular arrangements of transducer spacings was described with respect to different embodiments, it will be appreciated that other spacings could be utilized. In addition it will be appreciated that while particular modified pencil matrix algorithm was described for purposes of processing wave signals in order to generate a velocity-frequency plot, it will be appreciated that other algorithms could be utilized, such as the previously referenced techniques of Aeron, S. and Velero, H. P., "Automatic dispersion extraction using continuous wavelet transform," IEEE International Conference on Acoustics, Speech and Signal Processing, Las Vegas, Nev. (2008); Prosser, W. H., and Seale, M. D., "Time frequency analysis of the dispersion of Lamb modes," Journal of Acoustical Society of America, 105(5) pp. 2669-2676 (1999); and Roueff, A. et al., "Dispersion estimation from linear array data in the time-frequency plane," IEEE Transactions on Signal Processing, 53(1) pp. 3738-3780 (2005). Further, while a particular apparatus with one or more ultrasonic transmitters and one or more ultrasonic receivers has been described with the transmitter(s) and receiver(s) angled at particular angles relative to a transverse axis, it will be appreciated that other apparatus may be used and the transmitter(s) and/or receiver(s) may be angled at different angles, and if desired, those angles may be dependent on what medium the apparatus is submerged in during testing. By way of example only, the ultrasonic transmitter(s) and ultrasonic receiver(s) may be angled at an angle of between 20 and 35 degrees relative to the transverse axis when water is used as borehole fluid, and at angles of between 15 and 30 degrees when a fluid with a slower sound speed than water is used, and at angles of between 25 and 40 degrees when a fluid with a faster sound speed than water is used. It will therefore be appreciated by those skilled in the art that yet other modifications could be made. Accordingly, all such modifications are intended to be included within the scope of this disclosure as defined in the following claims. In the claims, means-plus-function clauses, if any, are intended to cover the structures described herein as performing the recited function and not only structural equivalents, but also equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method of evaluating an annulus between a borehole casing and a formation for a solid substance, comprising:

(a) obtaining waveform indications from at least one ultrasonic receiver that has received signals originating from at least one ultrasonic transmitter both located in fluid within the borehole casing, said waveform indications including waveform indications from a plurality of different transmitter-receiver axial distances;
(b) processing said waveform indications to generate a velocity-frequency dispersion;
(c) analyzing said velocity-frequency dispersion to determine the presence or absence of a non-dispersive headwave at a velocity other than at a velocity of a borehole fluid; and
(d) determining the presence or absence of a solid substance in the annulus based on said presence or absence of a non-dispersive headwave at a velocity other than at the velocity of the borehole fluid.

2. A method according to claim 1, further comprising:
determining at least one of a compressional wave velocity and a shear wave velocity of the solid substance if said analyzing determines the presence of a non-dispersive headwave at a velocity other than at a velocity of a borehole fluid.

3. A method according to claim 2, wherein:
said determining at least one of a compressional wave velocity and a shear wave velocity comprises utilizing prior knowledge of the solid substance.

4. A method according to claim 2, wherein:
said determining at least one of a compressional wave velocity and a shear wave velocity comprises utilizing an acoustic impedance measurement.

5. A method according to claim 1, wherein:
said processing comprises a velocity dispersion estimating algorithm.

6. A method according to claim 1, wherein:
said analyzing comprises identifying at least one dispersive mode signature in said velocity-frequency dispersion.

7. A method according to claim 6, wherein:
said analyzing further comprises subtracting an estimation of a contribution of said at least one dispersive mode signature to said waveform indications processed by said processing to obtain a residual signal, processing said residual signal to obtain a modified velocity-frequency dispersion, and analyzing said modified velocity-frequency dispersion to determine the presence or absence of a non-dispersive headwave at a velocity other than at a velocity of a borehole fluid.

8. A method according to claim 6, further comprising:
updating parameters of an algorithm utilized in said processing, and repeating said processing and said analyzing.

9. A method according to claim 2, further comprising:
repeating said obtaining, said processing, said analyzing, said determining the presence or absence of a solid substance, and said determining at least one of a compressional wave velocity and a shear wave velocity for a location along said borehole casing a plurality of times over a period of at least months.

10. A method according to claim 9, further comprising:
utilizing the plurality of determinations of said at least one of a compressional wave velocity and a shear wave velocity over a period of at least months to estimate a useful life of said solid substance.

11. A method according to claim 1, further comprising:
repeating said obtaining, said processing, said analyzing, and said determining the presence or absence of a solid substance along a length of the borehole casing; and generating a log, said log indicating the presence or absence of a solid substance along said length.

12. A method according to claim 11, further comprising:
determining at least one of a compressional wave velocity and a shear wave velocity of the solid substance if said analyzing determines the presence of a non-dispersive headwave at a velocity other than at a velocity of a borehole fluid, wherein
said log further indicates said at least one of a compressional wave velocity and a shear wave velocity along said length of the borehole casing.

13. A method according to claim 1, further comprising:
repeating said obtaining, said processing, said analyzing, and said determining the presence or absence of a solid substance azimuthally around a location of the borehole casing; and
generating a log, said log indicating the presence or absence of a solid substance azimuthally around the location of the borehole casing.

14. A method according to claim 13, further comprising:
determining at least one of a compressional wave velocity and a shear wave velocity of the solid substance if said analyzing determines the presence of a non-dispersive headwave at a velocity other than at a velocity of a borehole fluid, wherein
said log further indicates said at least one of a compressional wave velocity and a shear wave velocity azimuthally around the location of the borehole casing.

15. A method according to claim 13, wherein:
said at least one ultrasonic transmitter comprises an azimuthally arranged array of ultrasonic transmitters, and said at least one ultrasonic receiver comprises an azimuthally arranged array of ultrasonic receivers.

16. A method according to claim 1, further comprising:
locating a tool in fluid contained by the borehole casing, said tool including said at least one ultrasonic transmitter and said at least one ultrasonic receiver.

17. A method according to claim 16, wherein:
said tool has a longitudinal and transverse axes, and said at least one ultrasonic transmitter and said at least one ultrasonic receiver are angled at an angle of between 20 and 35 degrees relative to the transverse axis when water is used as borehole fluid, and 15 and 30 degrees when a fluid with a slower sound speed than water is used, and 25 and 40 degrees when a fluid with a faster sound speed than water is used.

18. A method according to claim 17, wherein:
said at least one ultrasonic transmitter generates sound waves in a portion of a frequency range of between 20 kHz and 1 MHz.

19. A method according to claim 1, wherein:
said waveform indications are filtered waveforms.

20. A method according to claim 19, wherein:
said filtered waveforms are waveforms devoid of late arrival information.

21. An apparatus for placement in borehole fluid for evaluating an annulus between a borehole casing and a formation, comprising:
a tool movable along a length of a borehole defined by the borehole casing, said tool having longitudinal and transverse axes, at least one ultrasonic transmitter for generating sound waves in a portion of a frequency range of between 20 kHz and 1 MHz, and at least one ultrasonic receiver for receiving waveform indications; and
a processing system adapted to receive said waveform indications from the at least one ultrasonic receiver, said processing system adapted to process said waveform indications to generate a velocity-frequency dispersion and to determine the presence or absence of a solid substance in the annulus based on the presence or absence of a substantially non-dispersive headwave at a velocity other than at a velocity of the borehole fluid.

22. An apparatus according to claim 21, wherein:
said at least one ultrasonic receiver comprises an array of axially displaced ultrasonic receivers.

23. An apparatus according to claim 22, further comprising:
a display configured to show at least one of said dispersion and an indication of a determination of the presence or absence of the solid substance in the annulus.

24. An apparatus according to claim 21, wherein:
said processing system is adapted to use a modified pencil matrix algorithm to generate a velocity-frequency dispersion.

25. An apparatus according to claim 23, wherein:
said processing system is further adapted to determine at least one of a compressional velocity and a shear velocity of the solid substance if said processing system determines the presence of a substantially non-dispersive headwave at a velocity other than at a velocity of a borehole fluid.

26. An apparatus according to claim 25, wherein:
said display is configured to show said at least one of a compressional velocity and a shear velocity along a length of said borehole.

27. An apparatus according to claim 25, wherein:
said processing system is further adapted to identify at least one casing dispersive mode signature in a velocity-frequency dispersion.

28. An apparatus according to claim 27, wherein:
said processing system is further adapted to subtract an estimation of a contribution of said at least one casing dispersive mode signature from said waveform indications to obtain a residual signal, and to process said residual signal to obtain a modified velocity-frequency dispersion plot for use in determining the presence or absence of a substantially non-dispersive headwave at a velocity other than at a velocity of a borehole fluid.

29. An apparatus according to claim 21, wherein:
said at least one ultrasonic transmitter comprises an azimuthally arranged array of ultrasonic transmitters, and said at least one ultrasonic receiver comprises an azimuthally arranged array of ultrasonic receivers.

30. An apparatus according to claim 21, wherein:
said tool has longitudinal and transverse axes, and said at least one ultrasonic transmitter is angled at an angle of between 15 and 40 degrees relative to the transverse axis, and said at least one ultrasonic receiver is angled at an angle of between 15 and 40 degrees relative to said transverse axis.

\* \* \* \* \*